United States Patent [19]

McConnell

[11] Patent Number: 4,822,494
[45] Date of Patent: Apr. 18, 1989

[54] CHEMICAL REMOVAL OF THIOUREA FROM HYDROCHLORIC ACID

[75] Inventor: Stanley B. McConnell, Broken Arrow, Okla.

[73] Assignee: Dowell Schlumberger Incorporated, Tulsa, Okla.

[21] Appl. No.: 69,375

[22] Filed: Jul. 1, 1987

[51] Int. Cl.$^4$ ............................................. C02F 1/76
[52] U.S. Cl. .................................... 210/721; 210/724; 210/752; 210/756; 210/759; 210/908; 423/488
[58] Field of Search ............... 210/721, 754, 756, 758, 210/759, 908, 912, 752, 724; 423/488

[56] References Cited

U.S. PATENT DOCUMENTS 4,387,029  6/1983  Huber et al. ........................ 210/758

FOREIGN PATENT DOCUMENTS 50-72451  6/1975  Japan ................................... 210/721
56-5183   1/1981  Japan ................................... 210/759
1028607   7/1983  U.S.S.R. .............................. 210/756

Primary Examiner—Peter Hruskoci
Attorney, Agent, or Firm—Stephen A. Littlefield

[57] ABSTRACT

A chemical method of removing thiourea from spent hydrochloric acid cleaning solutions comprising the steps of: adjusting the pH to not less than 12 by addition of base to remove metal hydroxides; oxidizing thiourea to urea by the addition of at least 4 moles of hydrogen peroxide per mole of thiourea; and further oxidizing urea to nonregulated/nonhazardous compounds by the addition of at least 3 moles of a hypochlorite per mole of urea. UV analysis confirms a greater than 98% removal of thiourea from solutions containing 0.4 to 2.7 wt. % thiourea after as little as 3 hours with an exotherm, $\Delta t$, of less than 105° F.

16 Claims, 6 Drawing Sheets

TOC
5M NaOCl
0.5 WT % M71 REACTION
AT pH = 12.5

TOC
5M NaOCl
0.5 WT % M71 REACTION
AT pH = 12.5

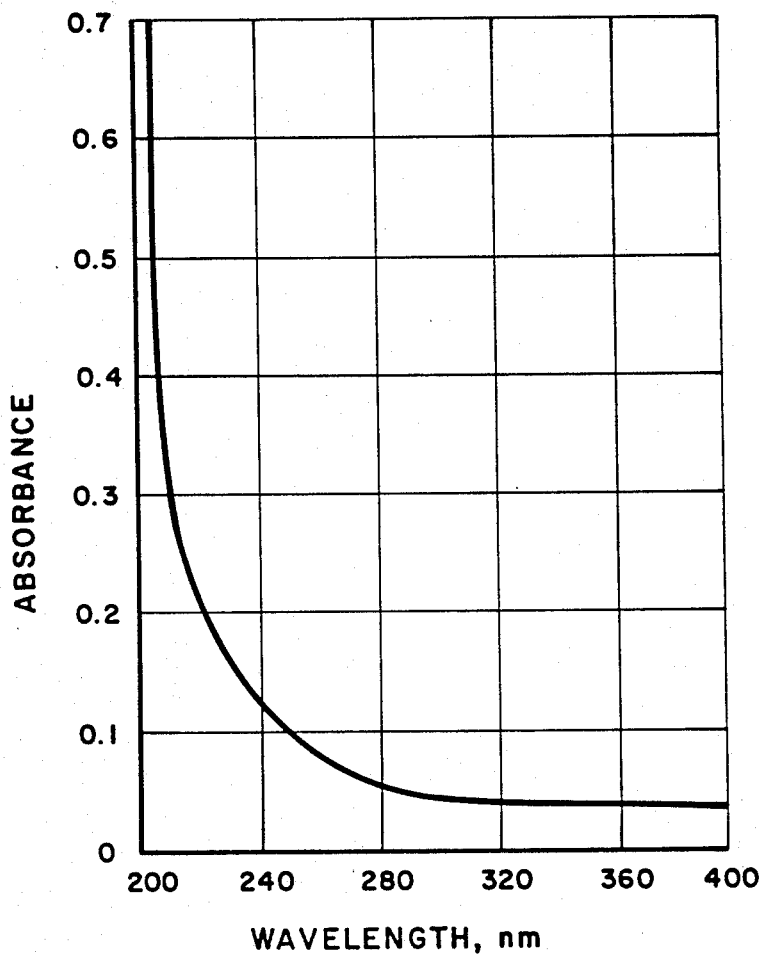

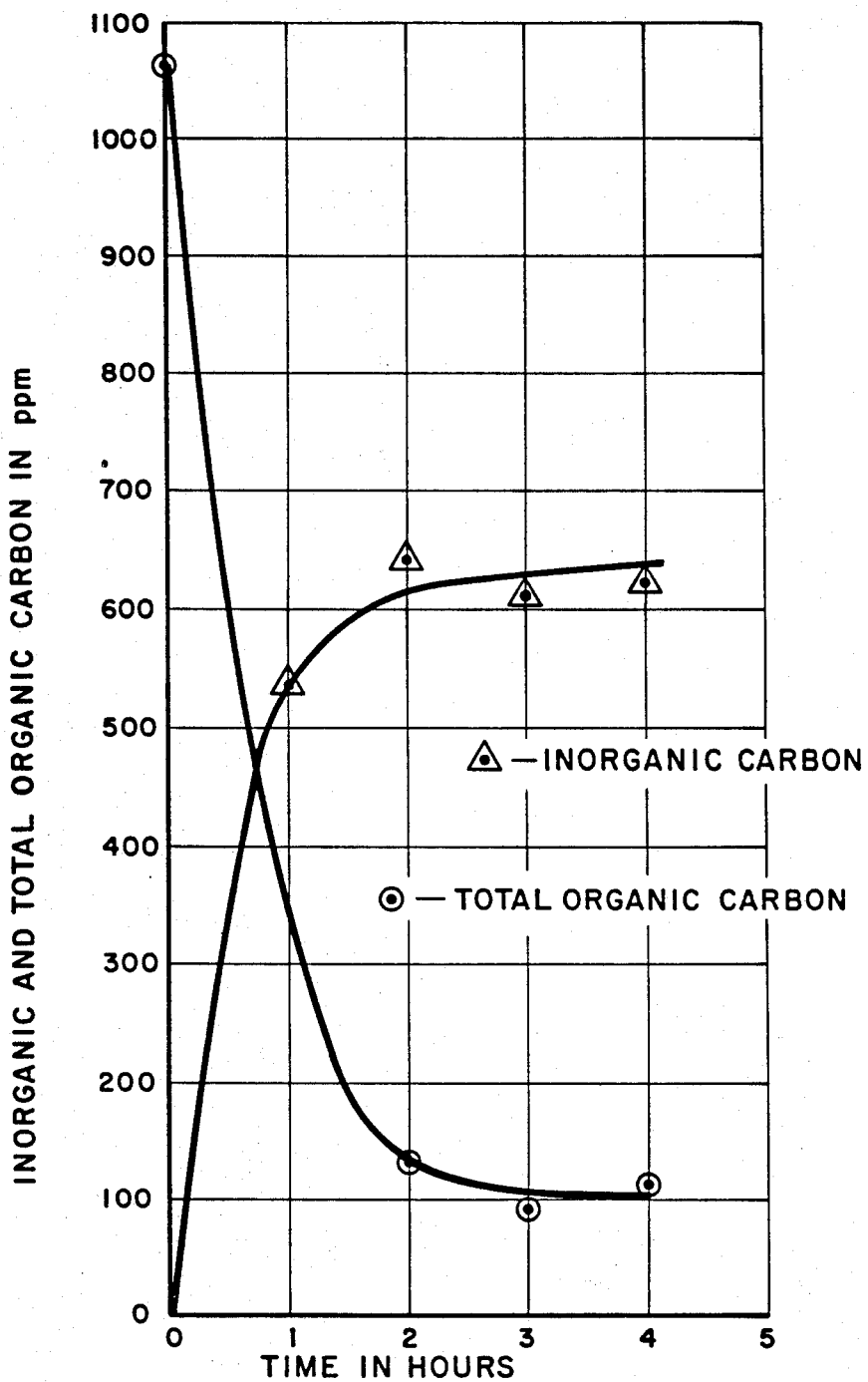
Fig. 6  TOC/IC OF NaOCl REACTION WITH ALKALINE PEROXIDE M71 SOLUTION

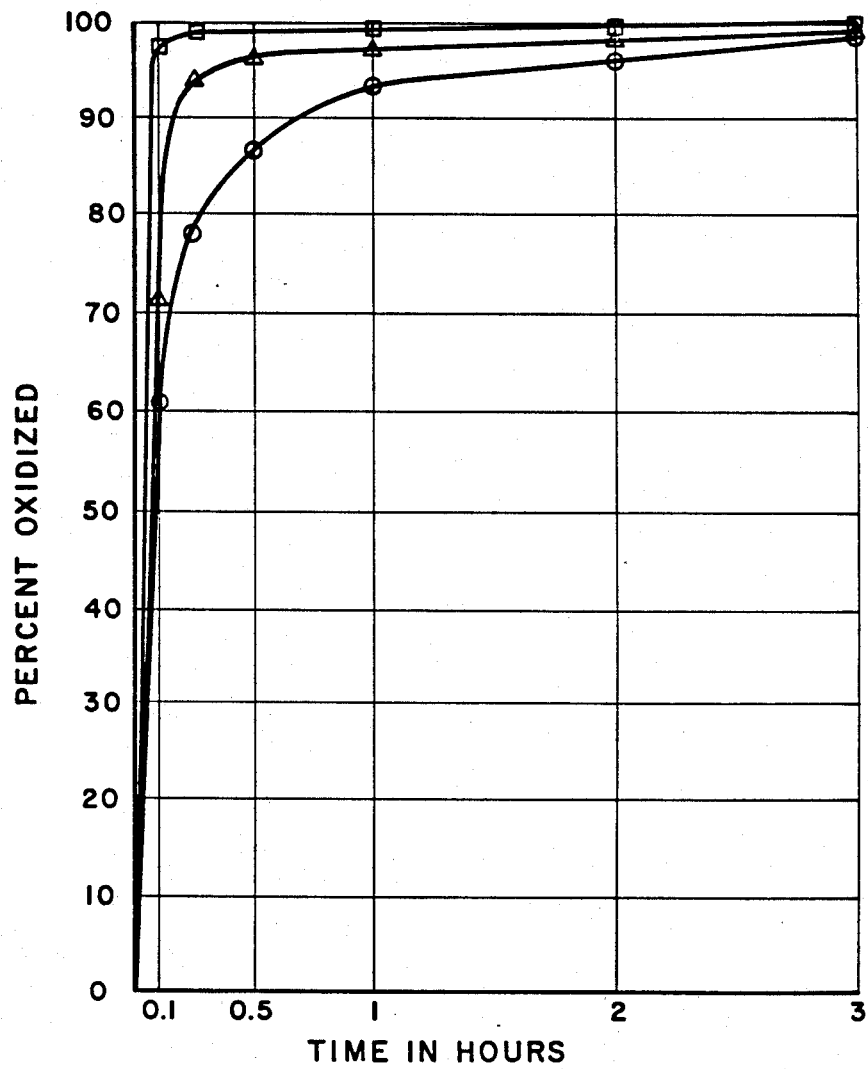

CHEMICAL REMOVAL OF THIOUREA FROM HYDROCHLORIC ACID

BACKGROUND OF THE INVENTION

1. Field of the Invention

The present invention relates to a method of removing thiourea, $NH_2CSNH_2$, from spent hydrochloric acid cleaning solvents. More specifically, the present invention relates to chemically oxidizing a thiourea containing solution into inert compounds using a two step process involving alkaline hydrogen peroxide followed by the addition of sodium hypochlorite.

2. Description of the Prior Art

Thiourea is used as a copper complexing agent with inhibited hydrochloric acid for simultaneous removal of iron oxide and copper oxide scales from the interior surfaces of industrial equipment and the like. Since thiourea is a suspected carcinogen in laboratory rodents it has been defined by the RCRA (Resource Conservation and Recovery Act) and the EPA (Environmental Protection Agency) Clean Water Act as a "hazardous substance". Therefore the removal of thiourea by chemical oxidation and/or chemical adsorption is essential to the industrial cleaning business.

At present, thiourea containing solutions are treated by either (1) thermal decomposition using sodium hydroxide at high temperature (e.g., 250° F.) over a prolonged period of time (e.g., 4 days) or (2) reacting with sodium hypochlorite. The disadvantages of these prior art methods include the cost and delay associated with the thermal decomposition process and the fact that the thiourea/sodium hypochlorite reaction forms hazardous chlorinated organic compounds.

SUMMARY OF THE INVENTION

The present invention provides a method of chemically treating thiourea containing acid solutions (e.g., such as spent hydrochloric acid cleaning solutions typically containing from 0.3 to 3.0 weight percent thiourea) by quantitatively converting the thiourea to non-regulated and nonhazardous substances. Preferrably the acid thiourea containing solution, according to the present invention, is treated with sufficient base to produce a pH in excess of 12. At such highly alkaline conditions metal oxides precipitate and are removed prior to the two step oxidation process of the present invention. The thiourea in the highly alkaline supernatant resulting from the removal of metal hydroxides is first reacted, preferrably quantitatively, with 4 moles of hydrogen peroxide to produce urea. The urea is then reacted, preferrably quantitatively, with 3 moles of a hypohalite (such as NaOCl) again at highly alkaline conditions. The reaction products of the second step are nitrogen, a halide salt, a carbonate salt (i.e., effectively $CO_2$) and water. The $H_2O_2$ reaction mechanism has been confirmed by total organic carbon (TOC) and ultraviolet (UV) analysis and the presence of urea has been verified by nuclear magnetic resonance (NMR). Because of the exothermic nature of the reaction steps the process can be initiated essentially at ambient or room temperature and proceeds with favorable kinetics.

Thus the present invention provides a method of removing thiourea from a thiourea containing acid solution comprising the steps of:

(a) adding an effective amount of a Group Ia hydroxide, Group IIa hydroxide or a mixture thereof to adjust the pH to not less than about 12, thus precipitating metal hydroxides and producing an alkaline thiourea containing solution;

(b) adding an effective amount of hydrogen peroxide to the alkaline thiourea containing solution produced in step (a), thus oxidizing the thiourea to urea according to the reaction,

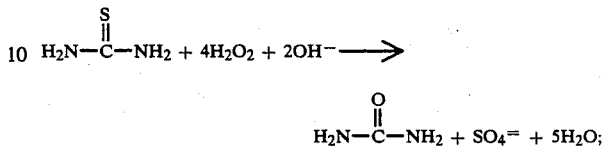

(c) adding an effective amount of a hypohalite, MOX where M is a Group Ia or Group IIa element and X is a halogen, to the alkaline urea containing solution produced in step (b) according to the reaction,

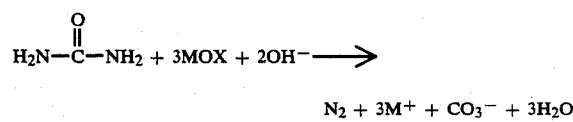

Preferrably solubilized metals are removed typically by precipitation as the metal hydroxides at a pH greater than 12.5 and filtration. Thus the present invention further provides that adding an effective amount of a Group Ia hydroxide, Group IIa hydroxide or mixture thereof further comprises the steps of:

(d) adjusting the pH of the thiourea containing acid solution from about 5.5 to about 6.5 by the addition of a Group Ia hydroxide;

(e) adjusting the pH of the solution produced in step (d) from about 7 to about 8 by the addition of an effective amount of $Mg(OH)_2$; and (f) adjusting the pH of the solution produced in step (e) to not less than about 12 by further addition of a Group Ia hydroxide.

To insure stoichiometric quantitative oxidation of thiourea to urea by hydrogen peroxide the amount of hydrogen peroxide and the presence of alkali is important. For example, if the reaction becomes acidic (i.e., pH <6), the products formed are orthorhombic sulfur, possibly guanylsulfinic acid, urea and inorganic sulfate.

Therefore the present invention further provides for the addition of at least 4 moles hydrogen peroxide per mole of thiourea and 2 moles of Group Ia hydroxide per mole of thiourea. Similarly the invention provides for the addition of 3 moles of hypohalite per mole of urea formed. The present invention is particularly useful for treating thiourea containing hydrochloric acid solutions. In such an embodiment the hypochlorite is particularly preferred.

It is an object of the present invention to provide a method of removing thiourea from spent hydrochloric acid cleaning solutions. It is a further object to provide a method of removing thiourea from hydrochloric acid waste solutions, after pH adjustment to greater than 12.5, by oxidation with hydrogen peroxide, thus producing urea. It is still a further object to provide for the removal of metal hydroxides before the oxidation of thiourea to urea and to provide for the subsequent oxidation of the urea to essentiallly inert nonhazardous products by a hypochlorite reaction. Fulfillment of these objects and the presence and fulfillment of additional objects will be apparent upon complete reading of the specifications and claims taken in conjunction with the attached drawing.

BRIEF DESCRIPTION OF THE DRAWING

FIG. 5 is the UV spectrum for a reaction solution produced for a 4 mole hydrogen peroxide per mole of thiourea in 1.0 wt. % thiourea solution.

FIG. 6 is a plot of TOC and IC of a reaction solution produced by hydrogen peroxide oxidation followed by NaOCl oxidation.

FIG. 7 is a plot of thiourea concentration as a function of time for a reaction solution produced by 4 moles of NaOH per mole of thiourea.

DESCRIPTION OF THE PREFERRED EMBODIMENTS

Figure 1:
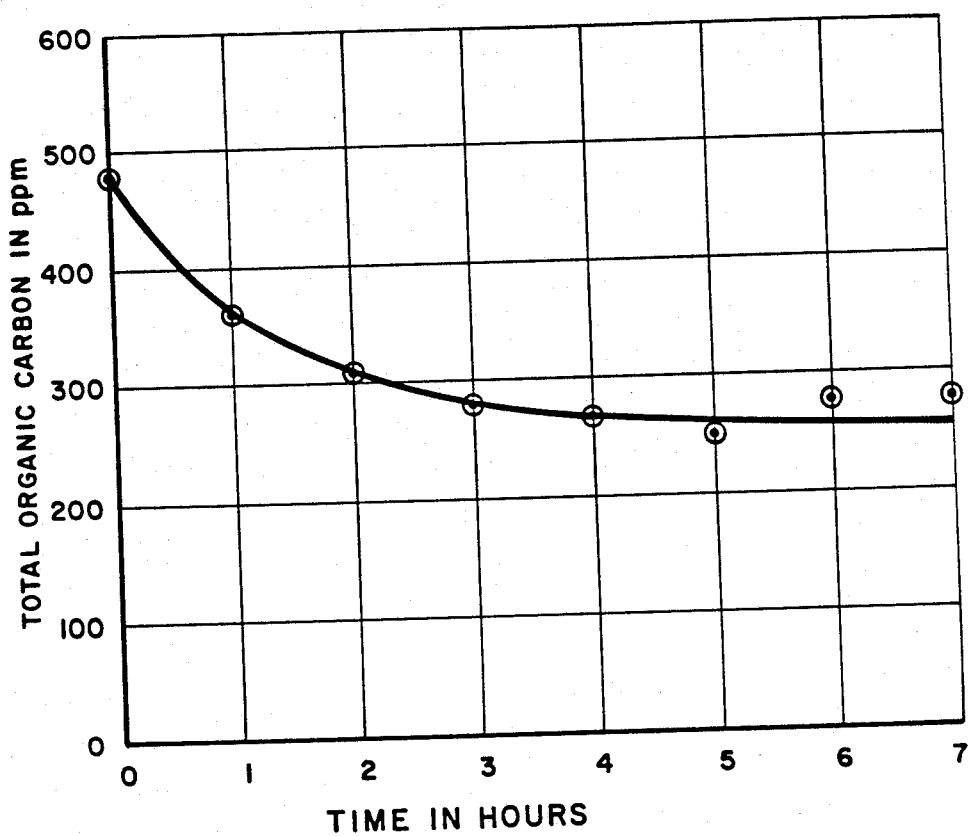
FIG. 1 is a plot of total organic carbon, TOC, as a function of time for 5 moles of NaOCl per mole thiourea in a 0.5 wt. % thiourea solution at pH=12.5.

The preferred thiourea containing acid solutions to be treated according to the method of the present invention are spent hydrochloric acid cleaning solvents; however, other such aqueous solutions containing dissolved thiourea as generally known in the art are considered equivalent for purposes of this invention. Typically the thiourea in such solvents is used as a copper complexing agent with inhibited hydrochloric acid to simultaneously remove iron oxide and copper oxide scales from the interior surfaces of industrial equipment. Frequently spent solutions contain from about 0.3 to about 3 wt.% thiourea, dissolved metals and some unspent acid.

Adjusting the pH prior to the conversion of thiourea to urea, according to the present invention, is intended to accomplish two things. First, the oxidative conversion and subsequent oxidative decomposition must be performed under highly alkaline conditions. Therefore, the addition of the base is necessary to establish the proper pH for oxidative conversion of thiourea to urea and inorganic sulfate using hydrogen peroxide. Of course, the highly alkaline environment is equally important in converting the urea to $N_2$, inorganic carbonate, halide salt and water using a hypochlorite. The second reason for adjusting the pH is to ensure the precipitation and subsequent removal of metal hydroxides.

The base employed in the present invention can be generally any Group Ia hydroxide, Group IIa hydroxide or mixture therof which produces the desired pH increase. In principle any corresponding basic anhydride or the like that hydrolyzes in water to produce the desired base is also operative and as such can be considered equivalent for purposes of this invention. Preferably NaOH or KOH is employed. In one particularly preferred embodiment, employed to ensure the removal of metal hydroxides, NaOH or the like is used to adjust the thiourea containing hydrochloric acid solution to a pH of 5.5 to 6.5. Then $Mg(OH)_2$ is added to produce a pH of 7 to 8. NaOH is then again added to raise the pH to the final value in excess of 12.

The oxidation of thiourea using alkaline hydrogen peroxide typically proceeds according to the following mechanism (illustrated using NaOH as base):

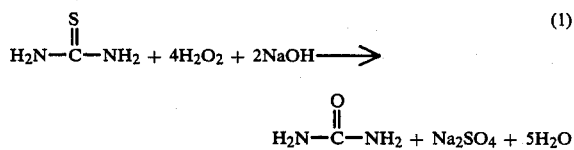

(1)

Preferably at least 4 moles of hydrogen peroxide are used for each mole of thiourea along with the addition of 2 moles of hydroxide per mole of thiourea in order to maintain the alkalinity. Total organic carbon (TOC) analysis, ultraviolet spectroscopy and nuclear magnetic resonance confirm the quantitative conversion. The alkaline peroxide/thiourea reaction is exothermic and the rate of the reaction will increase with increasing temperature. The amount of heat released and expected temperature rise of the worst case (adiabatic addition of peroxide, all at once, to a 3 wt. % thiourea solution) is approximately −320 kcal/mole thiourea and 124° C., respectively. As such, preferrably the reaction is performed at ambient temperature with a typical temperature rise of less than 40° C.

The oxidation of urea using an alkaline hypochlorite solution typically proceeds according to the following mechanism (illustrated using NaOCl):

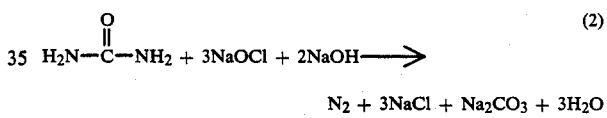

(2)

Preferably at least 3 moles of, in this illustrated embodiment, sodium hypochlorite are used for each mole of urea along with the addition of 2 moles of hydroxide per mole of urea, again in order to maintain the alkalinity. Upon addition of NaOCl to the solution, the total organic carbon content decreases to less than 100 ppm while the inorganic carbon increases, suggestive of and consistent with total oxidation to nitrogen gas, water and inorganic carbonate. If less than 3 moles of sodium hypochlorite is used, the oxidation of urea to $N_2$, $CO_3$ and $H_2O$ will be incomplete.

The hypohalite useful in the oxidation of urea according to the present invention is generallly any Group Ia or Group IIa hypohalite including by way of example but not limited thereto; sodium, potassium, magnesium or calcium hypochlorite or hypobromite and the like.

In the broadest sense the method according to the present invention can be performed on any aqueous solution containing the undesirable thiourea. Thus although the thiourea containing solution is preferably a waste or spent hydrochloric acid cleaning solution, other solutions containing thiourea are to be considered equivalent for purposes of this invention.

The following examples are presented to further illustrate the method according to the present invention.

EXAMPLE I

Laboratory solutions were prepared containing 0.50, 1.00 and 2.00 weight percent thiourea in 5 wt. % HCl. A 40 gram aliquot of the 0.50 wt. % stock solution was pH adjusted using 50 wt. % NaOH to a pH of 12.5. This solution was then analyzed by UV spectroscopy (236 to 238 nanometers) for concentration of thiourea, and the total organic content (TOC) was determined using a Beckman Model 915 B TOC analyzer. A 25 gram aliquot was then teated with a (4 to 6% weight active) sodium hypochlorite, NaOCl, solution at a nominal 5 moles of NaOCl per mole of thiourea. The weight of NaOCl needed for a 25 gram aliquot was calculated as follows: grams NaOCl {wt. % thiourea}{25}{74} {moles NaOCl needed}/{0.05 activity} {100}{76}; based on the proposed reaction

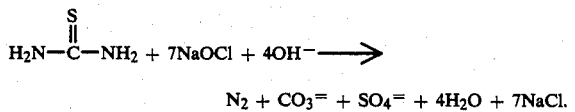

After addition of the NaOCl, the TOC and UV spectra were determined as a function of time. The process was repeated for the 1.00 wt. % thiourea solution using 7 moles NaOCl per mole thiourea. The results of these two runs are presented in FIGS. 1 through 4.

Figure 2:
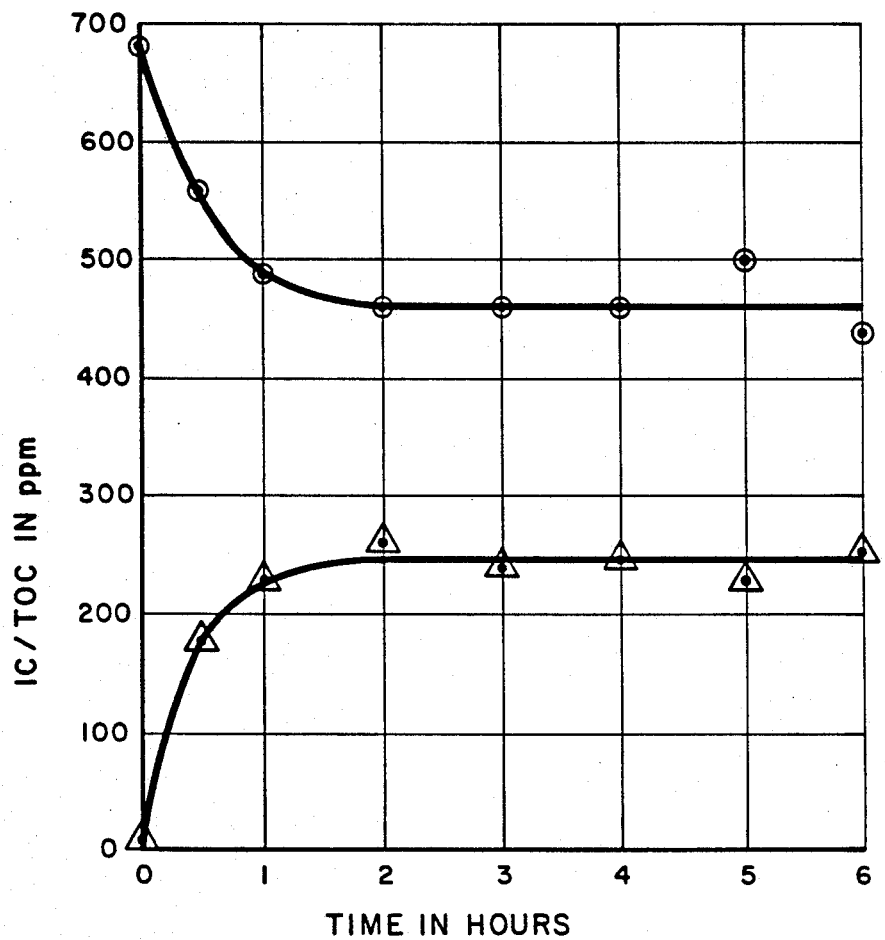
FIG. 2 is a plot of TOC and inorganic carbon, IC, as a function of time for 7 moles of NaOCl per mole thiourea in a 1.0 wt. % thiourea solution at pH=12.5.
Figure 3:
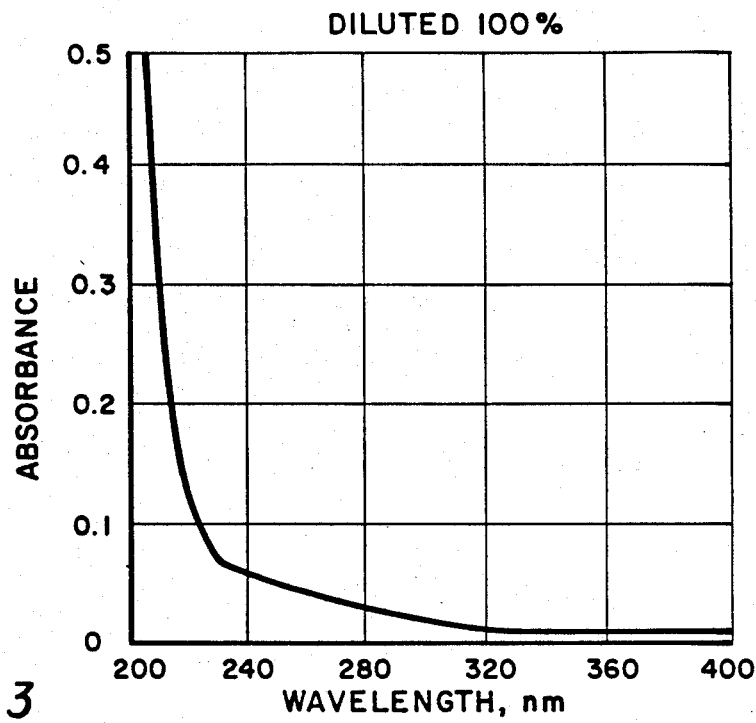
FIG. 3 is the ultraviolet, UV, spectrum of the reaction solution produced in FIG. 1.
Figure 4:
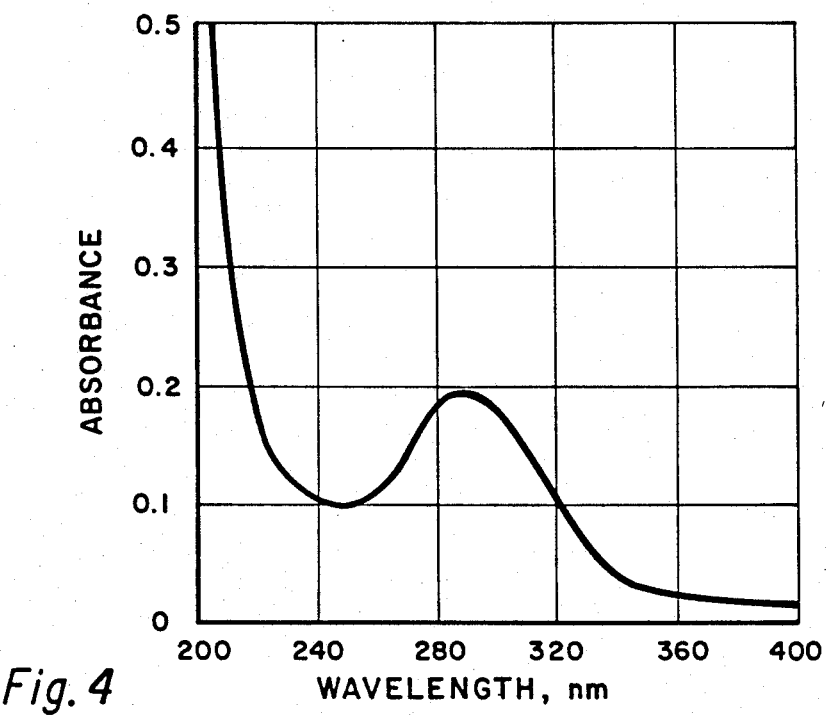
FIG. 4 is the UV spectrum of the reaction solution produced in FIG. 2.

The TOC of the 5:1, NaOCl:thiourea, solution at pH of 12.5 initially decreased but then stabilized after approximately 3 hours (FIG. 1). The TOC of the 7:1, NaOCl:thiourea, solution at pH of 12.5 also initially decreased and stabilized after approximately 3 hours (FIG. 2). FIG. 3 gives the UV spectra from 200–400 nanometers of the 5 and 7 mole NaOCl reactions with thiourea after 3 hours. The UV spectra show that the thiourea sulfur atom is removed. The TOC data in Figures 1 and 2 indicate a 50–60% reduction in organic carbon. The inorganic carbon (IC) of FIG. 2 of the 7 mole NaOCl reaction increases, indicating a partial oxidation of thiourea to inorganic carbonates. The TOC and IC results show that thiourea is not completely oxidized to nitrogen gas, water, inorganic sulfates and carbonates. The TOC and UV data indicate conversion of thiourea to other organic compounds: possibly chloramines, amidines, a carboxylic acid, or combinations of these products. Since the NaOCl/thiourea reaction is not a complete oxidation, some of the possible organic reaction products may be listed by RCRA of EPA as hazardous chemicals.

EXAMPLE II

To a 1.00 wt. % thiourea solution in 5 wt. % HCl was added sufficient 50 wt. % NaOH to adjust the pH to 13. This solution was then analyzed for thiourea by UV and TOC. Consistent with equation (1), sufficient 30 wt.% active $H_2O_2$ solution was added to a 20 gram aliquot based on the calculations: grams $H_2O_2$ {wt.% thiourea}{20}{34}{moles $H_2O_2$}/{0.30}{100}{76}and corresponding to nominally 4 moles $H_2O_2$ per mole of thiourea. The TOC and UV analyses were performed as a function of time. The results are presented in FIG. 5.

The TOC analysis of the 4:1, $H_2O_2$:thiourea, solution at pH of 13 remained constant. FIG. 5 shows the 3 hour UV spectrum for 200–400 nanometers for the reaction of $H_2O_2$ with thiourea at a pH of 13. The carbon-sulfur peak of thiourea is not present. These results are expected if the oxidation reaction quantitatively forms urea.

EXAMPLE III

To further verify the alkaline peroxide/thiourea reaction mechanism forming urea, NaOCl was added to the solution produced in Example II according to equation (1). To the urea containing solution produced from the initial 1.0 wt. % thiourea solution, was added 3 moles of NaOCl per mole of urea. TOC versus time was measured and is presented in FIG. 6. These results indicated that urea had been formed by alkaline peroxide and was further oxidized by NaOCl to nitrogen gas, water and inorganic carbonate. a nuclear magnetic resonance (NMR) spectrum was obtained on a 1.6 wt. % thiourea alkaline peroxide reaction solution and it verified the formation of urea. 98% of the thiourea was removed after 3 hours.

EXAMPLE IV

A series of field samples of spent thiourea solutions was treated using alkaline hydrogen peroxide oxidation after chemical precipitation of the metals. In order to simulate industrial field conditions (typically the use of a 15,000 gallon fracturing tank with very little heat transfer and maximum pump transfer thereto at a rate of 25 gallons per minute), a laboratory experiment was performed using a Pyrex wool insulated 125 ml Erlenmeyer flask and a syringe pump for addition of hydrogen peroxide. The syringe pump was designed to deliver 0.167 ml/min to the flask containing 100 ml of waste solution. The thiourea waste solution employed was a spent (used to remove metal scale) commercial solvent sold under the trade name XM71. The temperature of the reaction was monitored during the addition of the peroxide. Three hours after all the peroxide had been added, the concentration of thiourea, pH, total organic carbon (TOC), and sulfate was determined.

The procedure employed in the treatment involved initially determining the concentration of thiourea in the field sample by UV spectroscopy. A known weight (approximately 130 grams) of the field sample was placed in a beaker and an air line immersed to provide aeration and mixing. The metals were precipitated by using a combination of 50 wt. % NaOH and a 55 wt. % Mg(OH)$_2$ slurry sequentially added as follows: add NaOH to a pH 5.5 –6.5; add Mg(OH)$_2$ to a pH >7; and add NaOH to a pH >12.5.

The sample was then filtered using a Millipore Hazardous Filtration Vessel with a 5 micron filter and the weight of liquid and solids recorded. The concentration of thiourea in the filtrate and a deionized water extract of the solid was obtained by UV. The TOC, sulfate and pH were determined on the liquid phase. A 100 ml aliquot of the filtrate was then weighed into the insulated Erlenmeyer flask. Total grams of thiourea, amount of $H_2O_2$ needed, syringe pump time, and extra NaOH (i.e., 2 moles NaOH/1 mole thiourea) were calculated as follows: grams thiourea {ppm thiourea}{ sample weight}/106; grams $H_2O_2$ {grams thiourea}{5.97}; ml $H_2O_2$ {grams $H_2O_2$}{1.1}; pump time {$H_2O_2$}/{0.16}; and grams 50% NaOH {grams thiourea}{2.10}.

The NaOH was added to the Erlenmeyer fask and an air line immersed for aeration and mixing. An iron thermocouple was placed in the solution to monitor the reaction temperature. The hydrogen peroxide syringe pump time was set on the timer and the pump started. Three hours after all the peroxide had been added, the TOC, PH, thioruea and sulfate concentrations were determined. An NMR after the alkaline peroxide reaction to verify the formation of urea. The resulting data are presented in the following tables.

TABLE 1
PERCENT THIOUREA REMOVED BY HYDROGEN PEROXIDE

| Run | Initial Thiourea | After Metal Removal | 4 Hr After Add H$_2$O$_2$ | % Thiourea Removed |
|-----|------------------|---------------------|---------------------------|--------------------|
| 1 | 5140 ppm | 2420 ppm | 120 ppm | 95 |
| 2 | 990 ppm | 680 ppm | <50 ppm | >93 |
| 3 | 7230 ppm | 5010 ppm | 190 ppm | 96 |
| 4 | 19900 ppm | 15100 ppm | 170 ppm | 99 |

TABLE 2
TOTAL ORGANIC CARBON RESULTS (PPM)

| Run | Before Metal Precipitation | After Metal Precipitation | 4 hr After Add H$_2$O$_2$ |
|-----|----------------------------|---------------------------|---------------------------|
| 1 | 1440 | 1180 | 1110 |
| 2 | 980 | 860 | 740 |
| 3 | 2200 | 1700 | 1550 |
| 4 | 4210 | 3500 | 3300 |

TABLE 3
SULFATE CONCENTRATION IN H$_2$O$_2$/THIOUREA REACTION

| Run | Initial Sulfate | After Metal Removal | 4 Hr After Add H$_2$O$_2$ | Theoretical Sulfate | % Diff |
|-----|-----------------|---------------------|---------------------------|---------------------|--------|
| 1 | 0.0010 | 0.0010 | 0.30 | 0.31 | −3 |
| 2 | 0.0010 | 0.0010 | 0.091 | 0.086 | +6 |
| 3 | 0.0010 | 0.0010 | 0.58 | 0.63 | −8 |
| 4 | 0.0010 | 0.0010 | 1.99 | 1.91 | +4 |

TABLE 4
THIOUREA DISTRIBUTION AFTER FILTRATION OF METAL HYDROXIDES

| Run | Initial Thiourea | % Thiourea In Solids | % Thiourea In Filtrate Before H$_2$O$_2$ |
|-----|------------------|----------------------|------------------------------------------|
| 1 | 5140 ppm | 24 | 76 |
| 2 | 990 ppm | 25 | 76 |
| 3 | 7230 ppm | 34 | 66 |
| 4 | 19900 ppm | 24 | 76 |

From the above data it can be concluded that the akaline hydrogen peroxide process, according to the present invention, is successful in removing greater than 95% of the thiourea after 4 hours when applied to industrial field samples under conditions simulating a field application. The total organic carbon (TOC) after metal precipitaion and after peroxide addition remains relatively constant, consistent with the quantitative conversion of thiourea to urea. Any slight decrease in TOC can be attributed to dilution and/or experimental error. The thiourea sulfur atom is converted to an inorganic sulfate (within 5%). Also, monitoring the sulfate can indicate when the reaction is complete. The NMR spectrum of the final reaction solution from the field sample also confirms the formation of urea. The maximum temperature rise observed (approximately 105° F.) is less than the calculated adiabatic value. Approximately 28% of the thiourea is removed by precipitation of the metal hydroxides and is left in the resulting filter cake. The amount of thiourea left in the filter cake depends on the type of caustic used, amount of solubilized metals and amount of filter cake in the filter and is viewed as a physical removal rather than a chemical removal.

EXAMPLE V

In a manner analogous to the previous Example IV, a 100 ml aliquot of a XM71 thiourea waste sample was weighed in a beaker. The concentration of thiourea was determined by UV analysis. 50 wt. % NaOH was added to the sample while aerating, for precipitation of the metals. After reaching a pH greater than 12.5, an extra 2 moles NaOH per mole of thiourea was added, the concentration of thiourea determined and the weight of the solution obtained. The amount of H$_2$O$_2$ and syringe pump time needed to oxidize the thiourea in the field sample was calculated. The hydrogen peroxide syringe pump time was set on the timer and the syringe pump started. The precipitated metal hydroxides were not removed prior to addition of the hydrogen peroxide. The concentration of thiourea was determined at 1, 2 and 3 hour intervals after all the hydrogen peroxide had been added.

The effect of metal on the removal of thiourea in a field solution indicates that the peroxide activity has decreased by approximately 36% due to oxidation of the metals (e.g., Fe(II) Fe(III)). If the peroxide is added prior to metal hydroxide removal (filter pressing) the caustic for the alkaline peroxide/thiourea reaction will still need to be added and approximately 36% excess H$_2$O$_2$ will be needed for every 1% iron in the solution.

EXAMPLE VI

In order to evaluate the effect of caustic on thiourea without the hydrogen peroxide, the thiourea concentration in a commercial sample of spent XM71 industrial cleaning solvent was determined. A known weight was placed in a beaker on a hot plate and heated to a temperature of 150° F. An air line was immersed in the liquid to provide aeration and 50 wt. % NaOH solution was added to a pH greater than 12.5. An extra 4 moles of NaOH per mole of thiourea was then added to the solution. The concentration of thiourea and the solution weight were monitored over a period of 4 hours. No significant decrease in thiourea was observed, see FIG. 7. The process was then repeated on nominal 1 wt. % and 2 wt. % thiourea acid solutions (5 wt. % HCl) wherein the pH was adjusted to greater than 10 by addition of NaOH. The thiourea concentration was monitored (liquid chromatography, UV spectroscopy, TOC) for 12 days. The resulting data are presented in the Table below. Again no significant decomposition of thiourea was observed.

TABLE 5
EFFECT OF CAUSTIC ON THIOUREA
(concentration in weight percent)

| Initial | Day 1 | Day 4 | Day 12 |
|---------|-------|-------|--------|
| 1.00 | 0.99 | 0.99 | 0.99 |
| 2.00 | 1.99 | 2.11 | 2.07 |

EXAMPLE VII

In order to implement the method according to the present invention for use in the field, air agitation of the treatment tank containing the waste thiourea containing cleaning solution is begun to aid mixing. A 50 wt. % solution of sodium hydroxide is then pumped into the treatment tank while monitoring the pH until a pH of 5.5 to 6.5 is obtained. Magnesium hydroxide, approximately 8 gallons of 55 wt. % solution per 1000 gallons of waste, is then slowly pumped into the tank, again while monitoring the pH until a pH of 7 to 8 is reached. Additional magnesium hydroxide solution is added, up to 1 gallon of 55 wt. % solution per 1000 gallons of waste, if needed to obtain the desired pH. Additional 50 wt. % sodium hydroxide solution is then slowly pumped into the tank until the pH is equal to or greater than 12.5. The precipitated metal hydroxides are treated in a filter press and the solution is transferred to another treatment tank. Vigorous air agitation of the filtrate tank to aid in mixing is begun. An additional 0.16 gallons of 50 wt.% sodium hydroxide solution per pound of thiourea used in the cleaning job is pumped into the tank. This is followed by pumping into the tank 0.54 gallons of 30 wt.% hydrogen peroxide solution per pound of thiourea used in the cleaning job. Approximately six hours after the hydrogen peroxide addition, 2.6 gallons of 12.5 wt.% sodium hyupochlorite per pound of thiourea used in the cleaning job is pumped into the tank. The reaction is monitored until all of the urea has decomposed.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. A method of removing thiourea from a thiourea containing acid solution comprising the steps of:
   (a) adding an effective amount of a Group Ia hydroxide, Group IIa hydroxide or a mixture thereof to adjust the pH to not less than about 12, thus precipitating any alkaline insoluble metal hydroxides present in said acid solution and producing an alkaline thiourea containing solution and separating said metal hydroxides from said alkaline thiourea containing solution;
   (b) adding an effective amount of hydrogen peroxide to the separated alkaline thiourea containing solution produced in step (a), thus oxidizing the thiourea to urea according to the reaction,

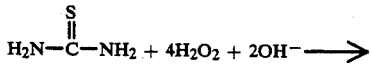

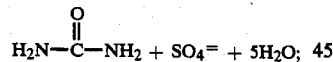

;and
   (c) adding an effective amount of a hypohalite salt MOX where M is a Group Ia or Group IIa element and X is a halogen, to the alkaline urea containing solution produced in step (b) to oxidize said urea according to the reaction,

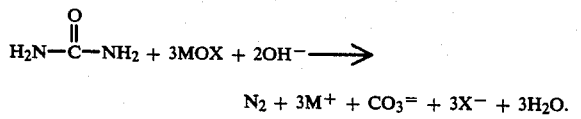

2. A method of claim 1 wherein said adding of an effective amount of a Group Ia hydroxide, Group IIa hydroxide or mixture thereof further comprises the steps of:
   (d) adjusting the pH of the thiourea containing acid solution from about 5.5 to about 6.5 by the addition of a Group Ia hydroxide;
   (e) adjusting the pH of the solution produced in step (d) from about 7 to about 8 by the addition of an effective amount of $Mg(OH)_2$; and
   (f) adjusting the pH of the solution produced in step (e) to not less than about 2 by further addition of a Group Ia hydroxide.

3. A method of claim 2 wherein said adding of an effective amount of hydrogen peroxide further comprises the addition of at least 4 moles of hydrogen peroxide per mole of thiourea and 2 moles of Group Ia hydroxide per mole of thiourea.

4. A method of claim 3 wherein said adding of an effective amount of hypohalite further comprises the addition of at least 3 moles of hypohalite per mole of urea.

5. A method of claim 2 wherein said adding of an effective amount of hypohalite further comprises the addition of at least 3 moles of hypohalite per mole of urea.

6. A method of claim 1 wherein said adding of an effective amount of hydrogen peroxide further comprises the addition of at least 4 moles of hydrogen peroxide per mole of thiourea and 2 moles of Group Ia hydroxide per mole of thiourea.

7. A method of claim 6 wherein said adding of an effective amount of hypohalite further comprises the addition of at least 3 moles of hypohalite per mole of urea.

8. A method of claim 1 wherein said adding of an effective amount of hypohalite further comprises the addition of at least 3 moles of hypohalite per mole of urea.

9. A method of removing thiourea from a thiourea containing hydrochloric acid solution comprising the steps of:
   (a) adding an effective amount of a Group Ia hydroxide, Group IIa hydroxide or mixture thereof to adjust the pH to not less than about 12, thus precipitating any alkaline insoluble metal hydroxides present in said acid solution and producing an alkaline thiourea containing solution and separating said metal hydroxides from said alkaline thiourea containing solution;
   (b) adding an effective amount of hydrogen peroxide to the separated alkaline thiourea containing solution produced in step (a), thus oxidizing the thiourea to urea according to the reaction,

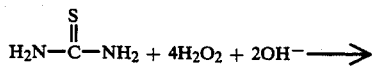

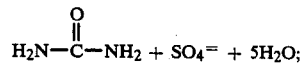

and
   (c) adding an effective amount of a hypochlorite salt MOCl where M is a Group Ia or Group IIa element, to the alkaline urea containing solution produced in step (b) to oxidize said urea according to the reaction,

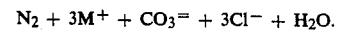

10. A method of claim 9 wherein said adding of an effective amount of a Group Ia hydroxide, Group IIa hydroxide or mixture thereof further comprises the steps of:
- (d) adjusting the pH of the thiourea containing hydrochloric acid solution from about 5.5 to about 6.5 by the addition of a Group Ia hydroxide;
- (e) adjusting the pH of the solution produced in step (d) from about 7 to about 8 by the addition of an effective amount of $Mg(OH)_2$; and
- (f) adjusting the pH of the solution produced in step (e) to not less than about 12 by further addition of a Group Ia hydroxide.

11. A method of claim 10 wherein said adding effective amount of hydrogen peroxide further comprises the addition of at least 4 moles of hydrogen peroxide per mole of thiourea and 2 moles of Group Ia hydroxide per mole of thiourea.

12. A method of claim 11 wherein said adding of an effective amount of hypohalite further comprises the addition of at least 3 moles of hypohalite per mole of urea.

13. A method of claim 10 wherein said adding of an effective amount of hypohalite further comprises the addition of at least 3 moles of hypohalite per mole of urea.

14. A method of claim 9 wherein said adding of an effective amount of hydrogen peroxide further comprises the addition of at least 4 moles of hydrogen peroxide per mole of thiourea and 2 moles of Group Ia hydroxide per mole of thiourea.

15. A method of claim 10 wherein said adding effective amount of hypohalite further comprises the addition of at least 3 moles of hypohalite per mole of urea.

16. A mehod of claim 9 wherein said adding of an effective amount of hypohalite further comprises the addition of at least 3 moles of hypohalite per mole of urea.

* * * * *